United States Patent
Lee et al.

(10) Patent No.: US 12,482,303 B2
(45) Date of Patent: Nov. 25, 2025

(54) SYSTEM FOR RECORDING EVENT DATA OF AUTONOMOUS VEHICLE

(71) Applicants: HYUNDAI MOTOR COMPANY, Seoul (KR); Kia Corporation, Seoul (KR)

(72) Inventors: Keon Chang Lee, Seoul (KR); Wha Pyeong Lim, Hwaseong-si (KR); Seung Wook Park, Yongin-si (KR)

(73) Assignees: HYUNDAI MOTOR COMPANY, Seoul (KR); KIA COROPATION, Seoul (KR)

( * ) Notice: Subject to any disclaimer, the term of this patent is extended or adjusted under 35 U.S.C. 154(b) by 109 days.

(21) Appl. No.: 17/778,521

(22) PCT Filed: Nov. 20, 2020

(86) PCT No.: PCT/KR2020/016445
§ 371 (c)(1),
(2) Date: May 20, 2022

(87) PCT Pub. No.: WO2021/101302
PCT Pub. Date: May 27, 2021

(65) Prior Publication Data
US 2023/0040552 A1    Feb. 9, 2023

(30) Foreign Application Priority Data

Nov. 22, 2019  (KR) .......................... 10-2019-0151529
Nov. 19, 2020  (KR) .......................... 10-2020-0155377

(51) Int. Cl.
*G07C 5/08*        (2006.01)
*B60W 60/00*    (2020.01)
(Continued)

(52) U.S. Cl.
CPC ............ *G07C 5/008* (2013.01); *B60W 60/005* (2020.02); *G07C 5/0808* (2013.01); *G07C 5/085* (2013.01); *H04W 4/44* (2018.02)

(58) Field of Classification Search
CPC ........ G07C 5/008; G07C 5/08; G07C 5/0816; G07C 5/0825; G07C 5/0833; G07C 5/085;
(Continued)

(56) References Cited

U.S. PATENT DOCUMENTS

| | | | | |
|---|---|---|---|---|
| 6,088,635 A | * | 7/2000 | Cox ...................... | B61L 23/041 701/19 |
| 10,909,782 B1 | * | 2/2021 | Natanzon ............. | G07C 5/0841 |

(Continued)

FOREIGN PATENT DOCUMENTS

| | | |
|---|---|---|
| CA | 3 045 139 A1 | 6/2018 |
| CN | 105976450 A  * | 9/2016 |

(Continued)

OTHER PUBLICATIONS

Wood, Matthew et al., "Safety first for automated driving", © Copyright 2019, 157 pages, downloaded from: https://www.aptiv.com/docs/default-source/white-papers/safety-first-for-automated-driving-aptiv-white-paper.pdf (Year: 2019).*

(Continued)

*Primary Examiner* — David A Testardi
(74) *Attorney, Agent, or Firm* — Morgan, Lewis & Bockius LLP

(57) ABSTRACT

A system for recording event data of an autonomous vehicle is disclosed. The present disclosure suggests an EDR system operation scheme suitable for properly investigating the cause of a vehicle accident. Subsystems of an autonomous driving control system may determine whether an event satisfying a preconfigured condition has occurred, and send (Continued)

to an EDR system a trigger signal to trigger recording of data elements related to the event when the occurrence of the event is detected. The EDR system may record data elements that are useful to reconstruct a map of an external environment surrounding an autonomous vehicle at the time of the occurrence of the event or to reconstruct an internal environment of the vehicle.

16 Claims, 14 Drawing Sheets

(51) Int. Cl.
  *G07C 5/00* (2006.01)
  *H04W 4/44* (2018.01)
(58) Field of Classification Search
  CPC .... G07C 5/0858; G07C 5/0866; B62D 41/00; B60R 11/0211; B60R 21/013; G05D 1/0088; G05D 1/80; G05D 1/86; B60W 60/005–0055
  See application file for complete search history.

(56) References Cited

U.S. PATENT DOCUMENTS

| | | | | |
|---|---|---|---|---|
| 11,615,141 | B1* | 3/2023 | Hoye | G06V 20/41 707/769 |
| 2007/0088488 | A1* | 4/2007 | Reeves | G07C 5/085 701/33.4 |
| 2007/0219685 | A1 | 9/2007 | Plante | |
| 2008/0126137 | A1 | 5/2008 | Kidd et al. | |
| 2008/0147266 | A1* | 6/2008 | Plante | G07C 5/008 701/33.4 |
| 2008/0147267 | A1* | 6/2008 | Plante | G07C 5/008 348/E7.086 |
| 2010/0013929 | A1* | 1/2010 | Lo | B62D 15/029 348/148 |
| 2011/0213526 | A1 | 9/2011 | Giles et al. | |
| 2012/0303215 | A1* | 11/2012 | Kim | B62D 41/00 701/36 |
| 2013/0135472 | A1* | 5/2013 | Wu | G07C 5/0866 348/148 |
| 2013/0274954 | A1* | 10/2013 | Jordan, Jr. | H04N 1/2133 701/1 |
| 2015/0072676 | A1* | 3/2015 | Jordan | G01S 5/0027 455/426.1 |
| 2015/0112542 | A1* | 4/2015 | Fuglewicz | G07C 5/0858 701/1 |
| 2016/0205117 | A1* | 7/2016 | Laifenfeld | H04B 1/3822 726/23 |
| 2017/0113664 | A1 | 4/2017 | Nix | |
| 2017/0124788 | A1 | 5/2017 | Nishida | |
| 2018/0007323 | A1* | 1/2018 | Botusescu | H04N 5/765 |
| 2018/0067491 | A1 | 3/2018 | Oder et al. | |
| 2018/0218758 | A1* | 8/2018 | Maeda | G07C 5/0866 |
| 2018/0357484 | A1* | 12/2018 | Omata | G06V 20/588 |
| 2019/0081960 | A1* | 3/2019 | Kupfer | H04L 63/1416 |
| 2019/0081966 | A1* | 3/2019 | Ploucha | H04L 63/1425 |
| 2019/0188930 | A1* | 6/2019 | Tsukahara | G07C 5/00 |
| 2019/0220011 | A1* | 7/2019 | Della Penna | G08G 1/0112 |
| 2019/0228228 | A1* | 7/2019 | Tsukahara | H04N 5/91 |
| 2019/0278278 | A1* | 9/2019 | Yasuda | B60W 30/085 |
| 2019/0287319 | A1* | 9/2019 | Golov | G06F 11/0751 |
| 2019/0302766 | A1* | 10/2019 | Mondello | H04L 9/3247 |
| 2019/0311554 | A1* | 10/2019 | Ewert | G07C 5/008 |
| 2020/0001868 | A1 | 1/2020 | Lee | |
| 2020/0043254 | A1* | 2/2020 | Hase | G08G 1/0133 |
| 2020/0074761 | A1* | 3/2020 | Tsuyunashi | G07C 5/0841 |
| 2020/0076895 | A1* | 3/2020 | Tsuyunashi | H04N 21/40 |
| 2020/0077292 | A1* | 3/2020 | Tsuyunashi | H04W 4/44 |
| 2020/0134943 | A1* | 4/2020 | Inagaki | G07C 5/02 |
| 2020/0210336 | A1* | 7/2020 | Bräutigam | G11C 11/005 |
| 2020/0225343 | A1* | 7/2020 | Lee | G01S 13/931 |
| 2020/0250901 | A1* | 8/2020 | Golov | B60R 21/0134 |
| 2020/0250902 | A1* | 8/2020 | Golov | B60R 21/0136 |
| 2020/0283028 | A1* | 9/2020 | Oba | B60W 60/0057 |
| 2020/0286308 | A1* | 9/2020 | Kiefer | H04W 4/46 |
| 2021/0056784 | A1* | 2/2021 | Nozawa | B60W 50/14 |
| 2021/0152580 | A1* | 5/2021 | Jester | H04L 63/1483 |
| 2021/0170948 | A1* | 6/2021 | Kishimoto | B60W 50/082 |
| 2021/0171059 | A1* | 6/2021 | Kishimoto | G06V 20/56 |
| 2021/0173406 | A1* | 6/2021 | Kishimoto | G06V 20/56 |
| 2021/0174610 | A1* | 6/2021 | Kishimoto | B60W 50/085 |
| 2021/0279975 | A1* | 9/2021 | Tsukahara | G07C 5/0841 |
| 2021/0303883 | A1* | 9/2021 | Jumonji | G08G 1/00 |
| 2022/0157092 | A1* | 5/2022 | Jia | B60W 30/0956 |
| 2022/0217298 | A1* | 7/2022 | Kasuya | H04N 5/77 |

FOREIGN PATENT DOCUMENTS

| | | | | |
|---|---|---|---|---|
| CN | 107042824 | A | 8/2017 | |
| CN | 110322592 | A | 10/2019 | |
| CN | 110473310 | A | 11/2019 | |
| JP | 08235484 | A * | 9/1996 | G07C 5/0891 |
| JP | 2011-96063 | A | 5/2011 | |
| JP | 2011096063 | A * | 5/2011 | |
| JP | 2016-009250 | A | 1/2016 | |
| JP | 2018-180843 | A | 11/2018 | |
| JP | 2018169667 | A * | 11/2018 | |
| JP | 2018-198004 | A | 12/2018 | |
| JP | 2019-197539 | A | 11/2019 | |
| KR | 10-2019-0093791 | A | 8/2019 | |
| KR | 10-2019-0099148 | A | 8/2019 | |
| KR | 20190093791 | A * | 8/2019 | |
| WO | WO-2019231135 | A1 * | 12/2019 | |
| WO | WO-2020145589 | A1 * | 7/2020 | G06F 16/245 |

OTHER PUBLICATIONS

Office Action issued on Dec. 22, 2023 in Chinese Patent Application No. 202080080487.2 with English translation.
Office Action issued on Dec. 24, 2024 in Japanese Patent Application No. 2022-529945 with English translation.
Office Action issued on Aug. 6, 2024 in Japanese Patent Application No. 2022-529945 with English translation Note: JP2018180843A, JP2018198004A and JP2019197539A cited therein are already of record.
Office Action issued on May 8, 2025 in Japanese Patent Application No. 2022-529945 with English translation (Note: US2019-0081960A, JP2019-197539A, JP2018-198004A and JP2018-180843A cited therein are already of record.).
Office Action issued on Apr. 21, 2025 in Korean Patent Application No. 10-2020-0155377 with English translation (Note: JP2018-180843A and US20190081960A1 cited therein are already of record.).

* cited by examiner

1: Controlled Vehicle Having MDPS Failure
2: EM Situation Where Controlled Vehicle Engages Emergency Braking

SYSTEM FOR RECORDING EVENT DATA OF AUTONOMOUS VEHICLE

CROSS-REFERENCE TO RELATED APPLICATION

The present application is a U.S. National Phase entry of International Patent Application No. PCT/KR2020/016445, filed Nov. 20, 2020, which claims priority to Korean Patent Application No. 10-2019-0151529, filed Nov. 22, 2019 and Korean Patent Application No. 10-2020-0155377, filed Nov. 19, 2020, the entire contents of which are incorporated herein for all purposes by this reference.

TECHNICAL FIELD

The present disclosure in some embodiments relates to a system for recording event data in an autonomous vehicle.

BACKGROUND

The statements in this section merely provide background information related to the present disclosure and do not necessarily constitute prior art.

An event data recorder (EDR) is a data recording device that is generally built into an airbag control module (ACU) of a vehicle to be responsive to a crash or event that occurred under certain conditions during the vehicle operation for recording, storing, and extracting driving information or crash information for a certain period before and after the event.

The EDR has recording items including vehicle speed, brake operation state, engine speed (RPM), accelerator pedal, throttle valve operation state, steering wheel angle, seat belt wearing status, crash severity (delta-V or acceleration), tire pressure, gear position, air-bag deployment data, etc.

An autonomous vehicle operates in such a way that the autonomous driving system recognizes the environment, judges or determines actions for each situation, and controls actuators, etc., based on information collected from inside and outside the vehicle. An error occurred in the recognition-judgment-control process in an autonomous vehicle could be tied to an accident, which makes it unsuitable to use the recording conditions or record items for typical vehicular EDR systems to properly identify the cause of the accident in the autonomous vehicle.

DISCLOSURE

Technical Problem

The present disclosure in some embodiments seeks to provide an operation scheme for an EDR system suitable for properly investigating the cause of an accident of an autonomous vehicle.

SUMMARY

At least one aspect of the present disclosure provides a method performed by a vehicle operating fully or partially in an autonomous driving mode (i.e., by an autonomous vehicle) for collecting and recording event data. This method includes receiving, from subsystems of an autonomous driving system, a trigger signal indicating the occurrence of an event of a plurality of events that are predefined, and collecting event data including at least data related to a recognition-judgment-control process of the autonomous driving system before and after the occurrence of the event, and recording the event data in internal storage and uploading the event data to a remote server communicatively linked with the autonomous vehicle.

In some embodiments, the event data further includes at least one of camera images inside and outside the autonomous vehicle, data of recognition of an occupant in the autonomous vehicle, software version information of electronic control units (ECUs) installed in the vehicle, and information related to a recently used vehicle-to-everything (V2X) message. In some embodiments, the event data further includes object recognition information suitable for reconstructing a map of the external environment surrounding the autonomous vehicle before and after the occurrence of the event. The object recognition information includes, for example, the position of an object, its class, and its relative velocity. In some embodiments, the event data is constituted by a data element or recording period which is different for at least some of the plurality of events.

In some embodiments, the receiving of the trigger signal includes receiving, from a subsystem that performs an autonomous driving function based at least in part on lane recognition information, the trigger signal indicating that the autonomous vehicle has departed from a lane. In some embodiments, the receiving of the trigger signal includes receiving, from a subsystem that performs an autonomous driving function based at least in part on a Time To Collision (TTC), a trigger signal indicating that the vehicle at a current speed cannot avoid a collision through braking the vehicle. In some embodiments, the receiving of the trigger signal includes receiving, from a subsystem of the autonomous driving system, a trigger signal indicating that an Emergency Maneuver (EM) or a Minimal Risk Maneuver (MRM) has been initiated. In some embodiments, the receiving of the trigger signal includes receiving, from a subsystem of the autonomous driving system, a trigger signal indicating the detection of an intrusion into an in-vehicle network.

In some embodiments, this method further includes in response to a new trigger signal indicating the occurrence of a new event received before a recording period of the event data ends, extending the recording period and additionally recording a type and an occurrence time of the new event.

At least one aspect of the present disclosure provides a vehicle system including an autonomous driving system configured to control a vehicle to operate fully or partially in an autonomous driving mode, a wireless communication system configured to enable communication between the vehicle and an external system, and an event data recorder (EDR) system configured to collect and manage event data. The EDR system is configured to (1) receive, from subsystems of an autonomous driving system, a trigger signal indicating the occurrence of an event of a plurality of events that are predefined, (2) collect event data including at least data related to a recognition-judgment-control process of the autonomous driving system before and after the occurrence of the event, and (3) record the event data in internal storage and upload the event data to a remote server via the wireless communication system.

DETAILED DESCRIPTION

Figure 1:
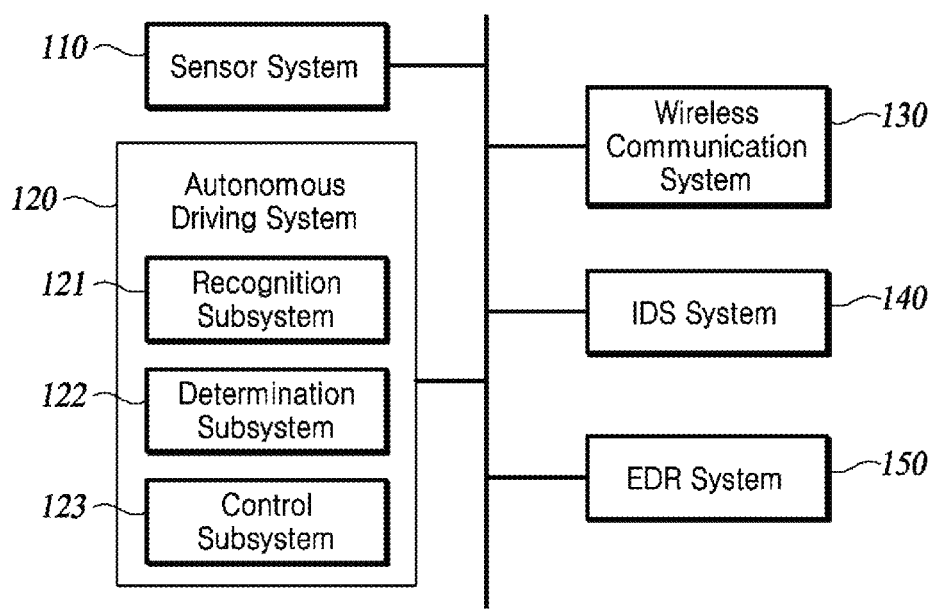
FIG. 1 is a functional block diagram depicting a vehicle according to at least one embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, A, B, (a), (b), etc., are used solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

FIG. 1 is a functional block diagram depicting a vehicle according to an exemplary embodiment of the present disclosure.

A vehicle may be configured to operate fully or partially in an autonomous driving mode and may therefore be referred to as an "autonomous vehicle." For example, upon receiving information from a sensor system 110 in the vehicle, an autonomous driving system 120 may operate in an automated manner to carry out one or more such control processes based on the received information as setting steering to avoid a detected obstacle.

The vehicle may be fully autonomous or partially autonomous. When it is partially autonomous, the vehicle may have some functions temporarily or continuously controlled manually by the driver. Further, the fully autonomous vehicle may be configured to be switchable between a fully manual operating mode and a partially autonomous operating mode, and/or a fully autonomous operating mode.

The vehicle may include various functional systems such as the sensor system 110, the autonomous driving system 120, a wireless communication system 130, and an intrusion detection system or IDS 140. The vehicle may include more or fewer (sub)systems and each (sub)system may include a plurality of components. Additionally, the (sub)systems of the vehicle may be interconnected. Accordingly, one or more of the described functional components of the vehicle may be divided into additional functional or physical components or combined into fewer functional or physical components.

The sensor system 110 includes one or more sensors configured to detect the environment surrounding the vehicle to obtain information thereof. For example, the sensor system 110 may include a global positioning system (GPS), a radar unit, a LiDAR unit, a camera, an inertial measurement unit (IMU), a microphone, and the like. The sensor system 110 may further include a sensor configured to monitor an internal system of the vehicle, e.g., a fuel gauge, engine oil temperature, wheel speed sensor, etc.

The autonomous driving system 120 may be configured to control the operation of the vehicle and its components. The autonomous driving system 120 may include a recognition subsystem 121, a determination subsystem 122, and a control subsystem 123.

The recognition subsystem 121 is configured to process and analyze data (e.g., image, video, depth data, etc.) captured by the sensor system to identify objects and/or features within the environment in which the vehicle is placed, which include lane information, traffic signals, other vehicles, pedestrians, obstacles, etc. The recognition subsystem 121 may use sensor fusion algorithms, object recognition algorithms, video tracking, or other computer vision techniques. The sensor fusion algorithm may provide various evaluations based on data from the sensor system. The evaluation may include evaluation of individual objects and/or features in the environment in which the vehicle is placed, evaluation of specific situations, and/or evaluation of possible impacts on driving based on those specific situations.

The determination subsystem 122 determines, based on the various evaluations of the recognition subsystem 121, behavior for each driving situation, i.e., each scenario, for example, the behavior of lane keeping, lane change, left and right turns, low-speed vehicle overtaking, U-turn, emergency stop, shoulder stopping, parking, etc. The decision subsystem 122 may also plan a route to a destination or plan an obstacle avoidance route.

The control subsystem 123 controls the movement of the vehicle by controlling actuators necessary for the vehicle to travel according to the behavior for each driving situation determined by the determination subsystem 122. For example, the control subsystem 123 may control a steering unit configured to adjust the steering of the vehicle. As another example, the control subsystem 123 may control a throttle unit that controls the operating speed of the engine and/or motor, thereby controlling the speed of the vehicle. As yet another example, the control subsystem 123 may control a braking unit configured to decelerate the vehicle.

The subsystems 121, 122, and 123 of the autonomous driving system 120 may cooperate to support various autonomous driving functions or Advanced Driver Assistance System (ADAS) functions, for example, Adaptive Cruise Control (ACC), Lane Keeping Assist System (LKAS), Forward Collision-Avoidance Assist (FCA), Autonomous Emergency Braking (AEB), etc. The subsystems 121, 122, and 123 of the autonomous driving system 120 may be implemented in a plurality of electronic control units (ECUs) or a computer system in the vehicle for carrying out one or more autonomous driving functions.

The wireless communication system 130 enables communications between the vehicle and an external system, e.g., another vehicle or server, etc. For example, the wireless communication system 130 may wirelessly communicate with one or more devices directly or through a communication network. The wireless communication system 130 may use one or a plurality of various wireless communication technologies such as cellular communications (e.g., GSM, CDMA, LTE, 5G, etc.), IEEE 802.11 communication protocol (e.g., WiFi, Bluetooth, ZigBee, etc.), and DRSC among others.

The intrusion detection system (IDS) 140 is configured to detect and tackle security threats to the in-vehicle network.

The autonomous driving system 120, its subsystems 121, 122, 123, as well as other subsystems not shown in FIG. 1 may generate data indicating whether one or more autonomous driving functions are currently activated. For example, the autonomous driving system 120 may generate data indicating whether the adaptive cruise control (ACC) function is currently activated. As another example, the autonomous driving system 120 may generate data indicating whether the driving of the vehicle is currently being controlled fully automatically rather than manually.

The vehicle further includes an event data recorder or EDR system 150 configured to receive data from various in-vehicle (sub)systems including the sensor system 110. One or more in-vehicle (sub)systems may provide data to the EDR system 150 via a data bus, e.g., CAN bus, Ethernet bus, etc. The EDR system 150 may collect in real-time the data and/or analog signals provided or shared by the respective (sub)systems via the data bus. The EDR system 150 may periodically sample data from the (sub)systems. The EDR system 150 may generate a time stamp for each sampled data point.

One or more (sub)systems may detect the occurrence of one or more preset events and provide trigger signals notifying the occurrence of the event to the EDR system 150, thereby causing the EDR system to record data related to the event (hereinafter referred to as 'EDR data') to non-volatile memory. The trigger signals may each include a unique identifier capable of uniquely identifying a related event or trigger condition. To at least some trigger signals, the EDR system may distinctively apply data elements to be recorded and/or recording periods.

The vehicle may be configured to upload EDR data via the wireless communication system 130 to a remote server (not shown) that collects and manages EDR data from multiple vehicles. The remote server may be operated by a vehicle manufacturer or by a service provider providing an EDR data management service.

Figure 2A:
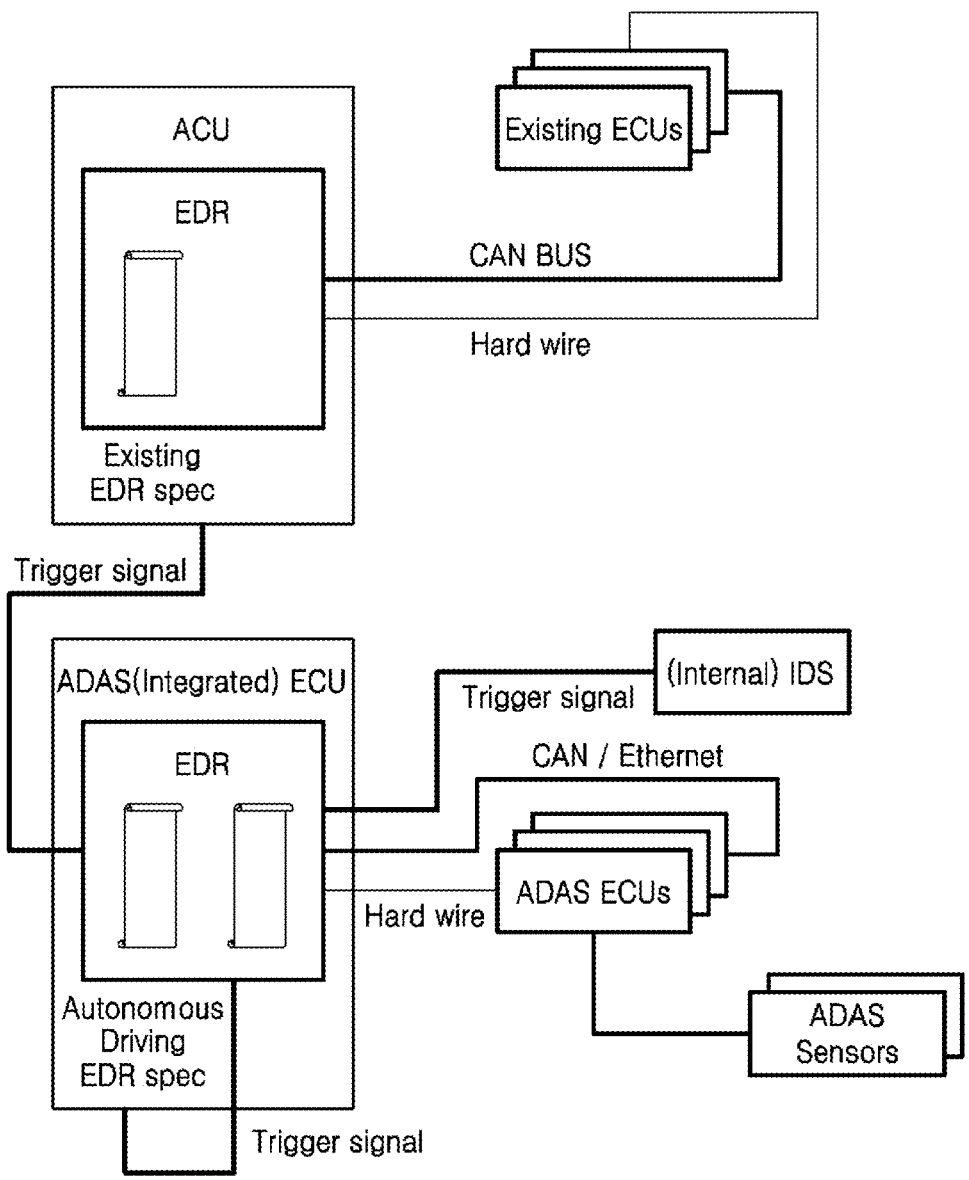
FIG. 2A, FIG. 2B and FIG. 2C are conceptual diagrams illustrating example architectures with EDR systems being deployed in an autonomous vehicle.
Figure 2B:
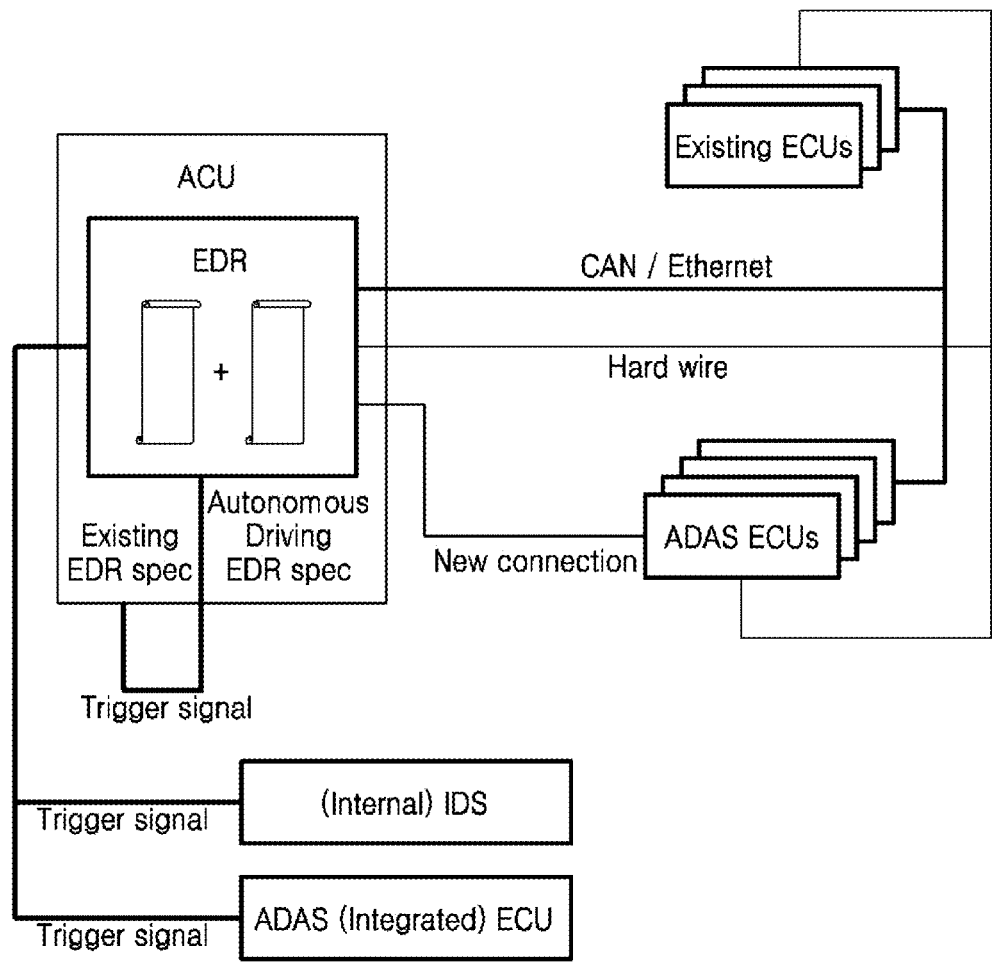
Figure 2C:
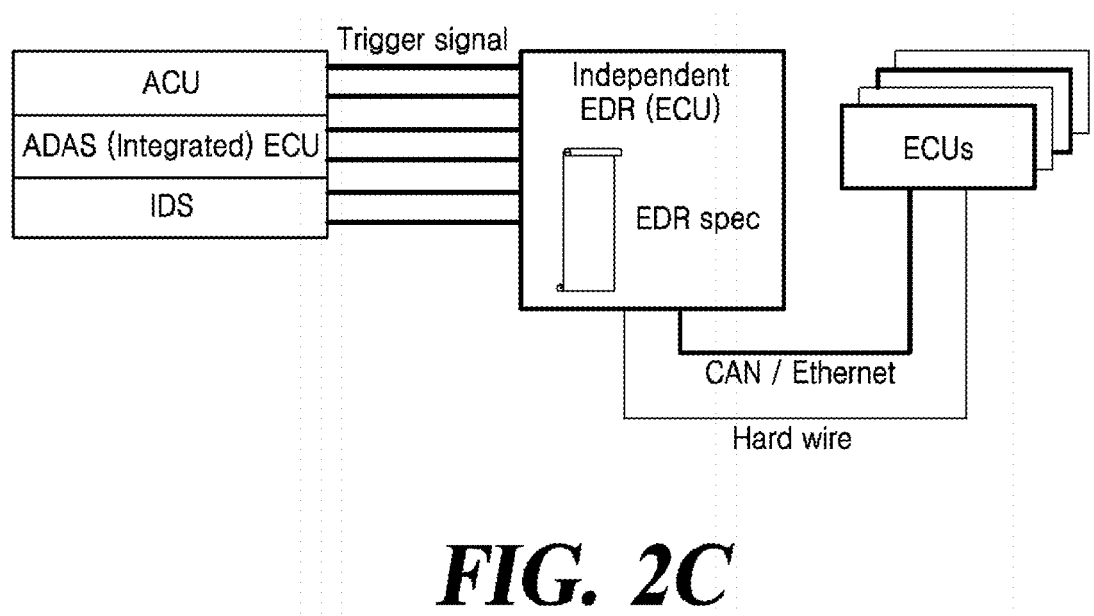

FIGS. 2A, 2B, and 2C are conceptual diagrams illustrating example architectures with EDR systems being deployed in an autonomous vehicle.

As illustrated in FIG. 2A, in the autonomous vehicle, an EDR system specialized for the autonomous vehicle may be embedded as a sub-module in the main controller (integrated ECU) of the autonomous driving system. The EDR system may receive trigger signals notifying the occurrence of an event from an airbag control module (ACM), an intrusion detection system (IDS), etc. located outside the main controller as well as from the main controller. Further, the autonomous vehicle may include an EDR system that is built as a sub-module in an airbag control unit (ACU) and operates in the same manner as a conventional EDR system.

As illustrated in FIG. 2B, the EDR system in the autonomous vehicle may be embedded as a sub-module in the ACU, like a conventional EDR system. The EDR system may receive trigger signals notifying the occurrence of an event from the ACU as well as the main controller of the autonomous driving system located outside the ACU, the IDS, and the like.

As illustrated in FIG. 2C, the autonomous vehicle may be installed with a dedicated ECU (electronic control unit) that performs an EDR function. The dedicated ECU may receive trigger signals notifying the occurrence of an event from the ACU on a vehicle network, the main controller of the autonomous driving system, the IDS, and the like.

Diversification of EDR Trigger Conditions

A conventional EDR system is configured to record predefined data elements upon receiving an event trigger signal from an Airbag Control Unit (ACU). Such an event may in particular be a traffic collision. A traffic collision may be detected, for example, when the deployment of an irreversible safety device, such as an airbag or a pretensioner, is triggered. A traffic collision may also be detected when an acceleration/deceleration occurs exceeding a predefined threshold, e.g., at a speed change of 8 km/h or more within 150 ms. These trigger conditions used in ordinary vehicles may not be suitable for properly identifying the cause of an accident in an autonomous vehicle. The present disclosure presents various event trigger conditions suitable for an autonomous vehicle and data elements suitable for reconstructing the environment inside and outside the vehicle surrounding the events. According to the present disclosure, subsystems of the autonomous driving control system may determine whether an event satisfying a preset event condition has occurred, and upon detecting the occurrence of the event, transmit an event trigger signal to the EDR system.

(1) Lane Departure

Where a Lane Keeping Assist System (LKAS) operates in the ADAS (Advance Driver Assistance System) technology, the EDR system recording may be triggered at a time when it is determined that the vehicle has largely deviated from its lane while the lane recognition is correct.

The LKAS may be provided with lane recognition information generated by a computer vision system upon recognizing a lane by analyzing image data outputted from a camera sensor. The lane recognition information includes not only a distance to a lane marking but also lane geometry parameters such as a heading angle and a curvature. The lane recognition information may be provided as a road equation in the form of a cubic function ($y=Ax^3+Bx^2+Cx+D$) describing the relative motion between the vehicle and the lane. Here, A denotes a curvature rate, B a curvature, C a heading angle, and D a lateral offset. Additionally, the lane recognition information may include a quality signal indicating the reliability of lane geometry measurement. The quality signal may be divided into a total of four levels: Very Low Quality, Low Quality, High Quality, and Very High Quality.

Figure 3:
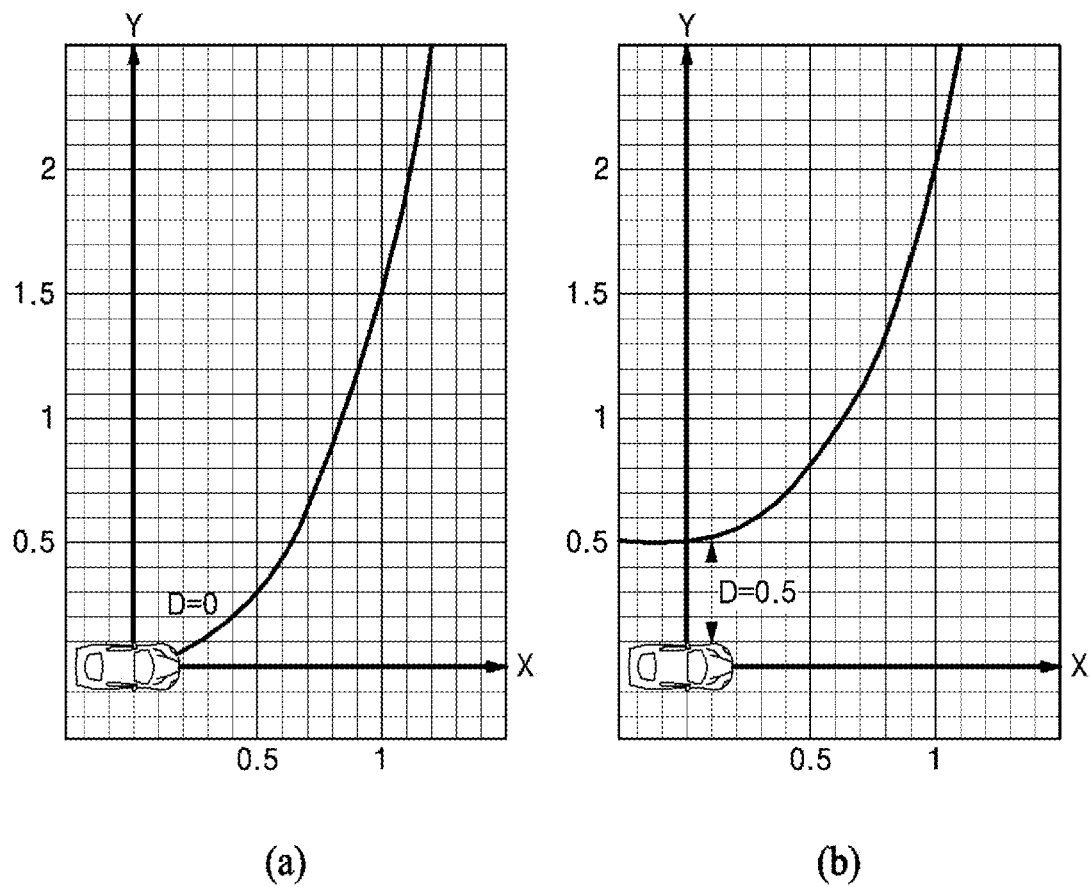
FIG. 3 is conceptual diagrams illustrating changes in parameters D according to recognized lane geometries and depending on whether or not a lane departure occurs.

FIG. 3 is conceptual diagrams illustrating changes in parameters D (=0, 0.5) according to recognized lane geometries and depending on whether or not a lane departure occurs. According to at least one embodiment, the present disclosure determines the degree of lane departure by using the magnitude of parameter D included in the lane recognition information and indicating the lateral distance between the vehicle and the lane, and upon detecting an excessive lane departure, generates a trigger signal that triggers the recording of the EDR system.

Figure 4:
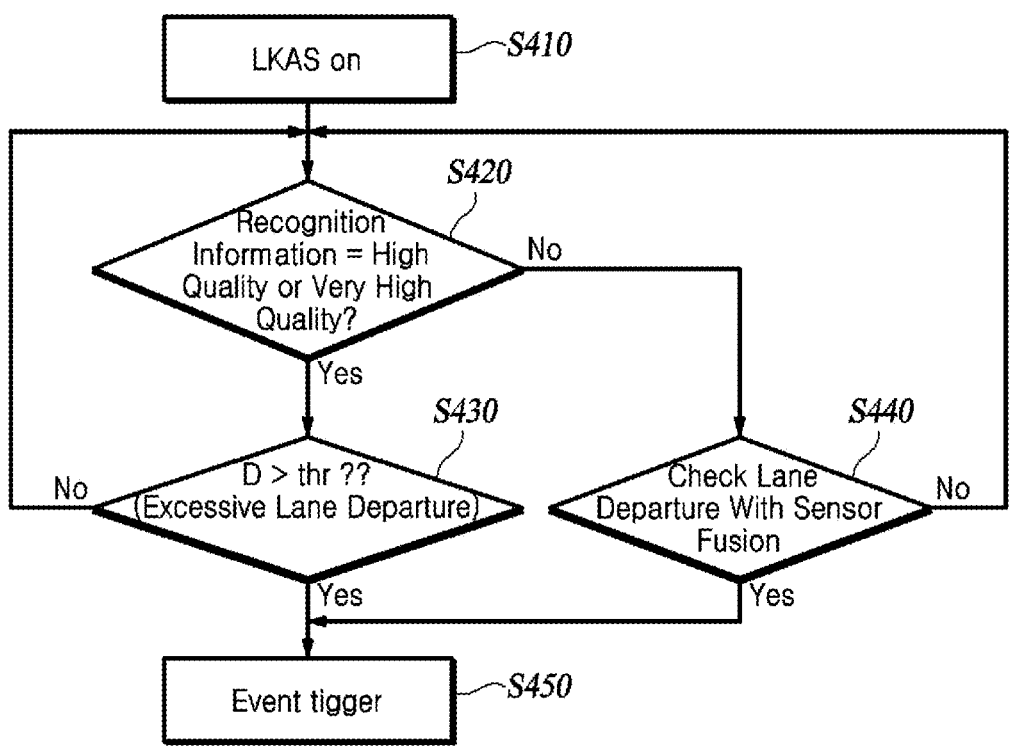
FIG. 4 is a flowchart of a method of determining, by a Lane Keeping Assist System (LKAS), the occurrence of an event to trigger an event data recorder (EDR) system, according to at least one embodiment of the present disclosure.

FIG. 4 is a flowchart of a method of determining, by the LKAS (Lane Keeping Assist System), the occurrence of an event to trigger an EDR system, according to at least one embodiment of the present disclosure.

The LKAS while in operation receives lane recognition information from the computer vision system (S410). The LKAS may determine whether a quality signal indicating the reliability of lane geometry measurement included in the lane recognition information is equal to or greater than a preset level, e.g., 'High Quality' (S420).

When the quality signal is equal to or greater than the preset level, e.g., 'High Quality', that is, 'Yes' in S420, the LKAS determines whether parameter D, which is included in the lane recognition information and indicates the lateral distance between the vehicle and the lane, exceeds a preset threshold (thr) (S430). When parameter D exceeds the preset threshold, that is, 'Yes' in S430, the LKAS generates a trigger signal that triggers the recording of the EDR system (S450).

When the quality signal is less than the preset level, e.g., 'High Quality', that is, 'No' in S420, the LKAS may determine whether a lane departure occurs by using data obtained from a sensor fusion, that is, different sensors including a GPS, camera sensor, radar sensor, LiDAR sensor, etc. (S440). For example, the LKAS may determine a virtual lane by mapping vehicle location information to a precision map, or by using data obtained from a camera sensor for vehicular surround view monitor (SVM), or by using other vehicles' positions recognized with the radar sensor or LiDAR sensor as a basis for the virtual lane determination, and then determine whether the vehicle departs the lane based on the virtual lane. Upon detecting the lane departure based on the sensor fusion, that is, 'Yes' in S440, the LKAS generates a trigger signal that triggers the recording of the EDR system (S450).

(2) Imminent Time to Collision (TTC)

Time To Collision or TTC is one of the most widely used metrics when determining the possibility of collision with an obstacle (vehicle or pedestrian) in front or behind. TTC is used not only for a Forward Collision-Avoidance Assist (FCA) system but also to measure the risk of collision with obstacles around the vehicle. For example, if there is a short-distance cut-in vehicle, the TTC may be a criterion for determining whether the subject vehicle accelerates or decelerates.

TTC is generally defined as 'relative distance/relative speed', and the acceleration of the vehicle is also considered to more accurately measure the risk of collision. The autonomous driving system may calculate the TTC by estimating the relative distance and relative speed of the obstacle ahead through a radar sensor, camera sensor, LiDAR sensor, ultrasonic sensor, or data fusion of these. Alternatively, a more accurate TTC calculation may be made using the position and speed of the surrounding vehicle obtained through vehicle-to-vehicle or V2V communications. The steering angle or brake status value of the surrounding vehicle directly obtained through V2V communications would allow the motion of the surrounding vehicle to be predicted far ahead of its detection by the environmental sensors. Additionally, with the V2V communications used, information on the surrounding vehicles can be obtained even when no field of view is secured.

FCA or similar collision mitigation system has the core purpose of mitigating the damage caused by a collision. The basic concept of the system is to reduce the possible damage at a collision by reducing the collision energy as much as possible through pre-braking. In the case of low-speed driving, emergency braking is performed right before the collision to stop the vehicle immediately before an accident occurs, but at medium speeds or higher, where the inertia is relatively high, it may be difficult to avoid the collision itself even if the FCA system operates normally. However, even if a collision occurs, since emergency braking is already performed immediately before the collision, a significant portion of the speed energy is offset in the actual collision situation, thereby reducing so much damage due to the accident.

According to at least one embodiment of the present disclosure, if the TTC is very short or it is determined that the collision cannot be avoided even if emergency braking is performed based on the current speed, the recording of the EDR system may be triggered before the actual collision occurs.

Figure 5:
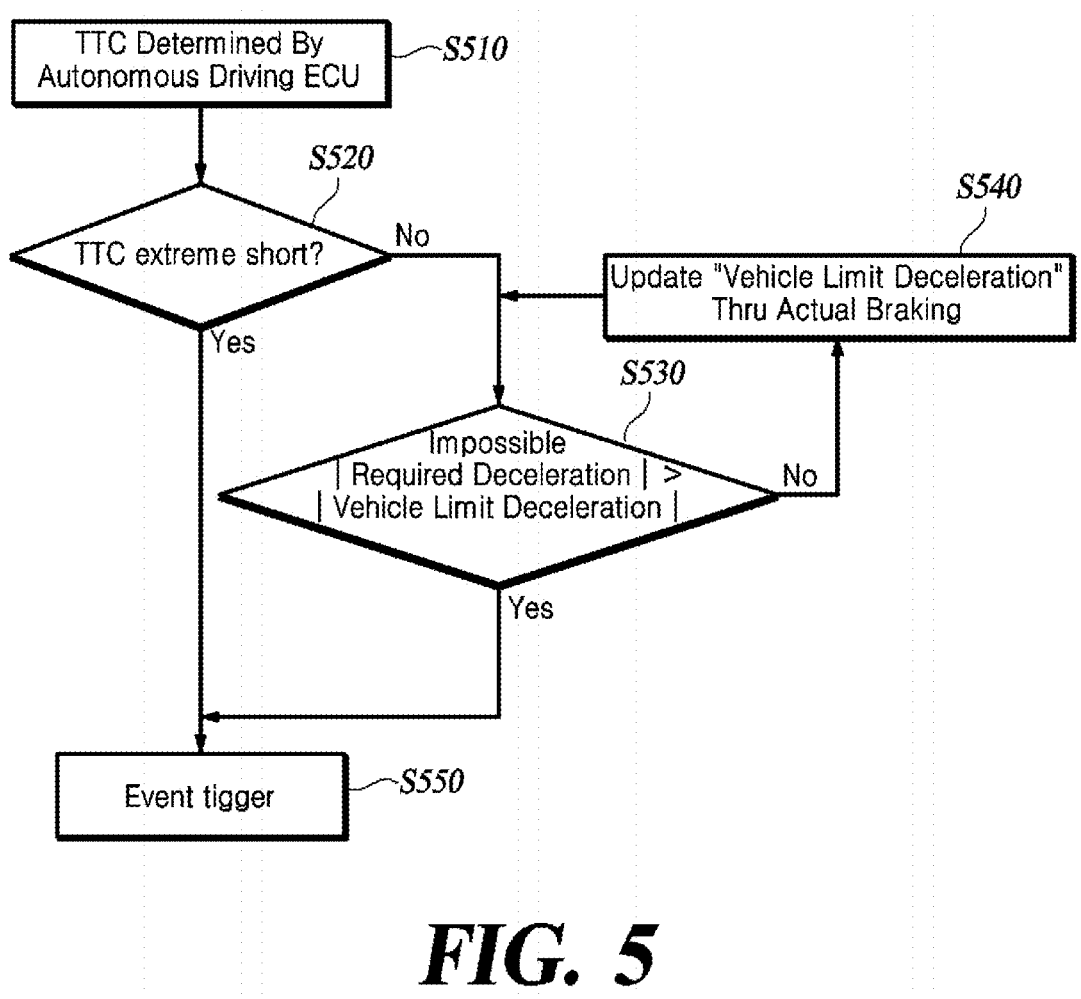
FIG. 5 is a flowchart of a time to collision- or TTC-based method of determining the occurrence of an event to trigger an EDR system, according to at least one embodiment of the present disclosure.
Figure 6A:
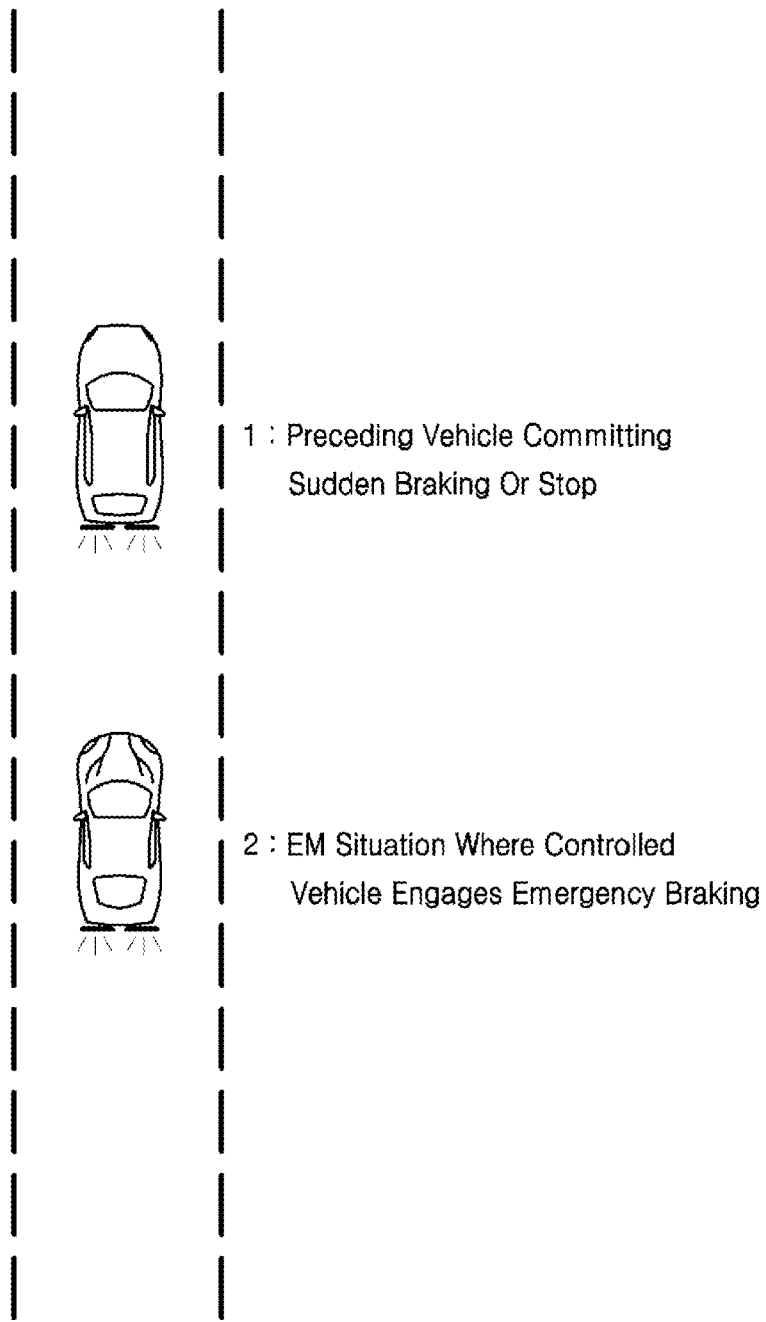
FIG. 6A, FIG. 6B, FIG. 6C and FIG. 6D illustrate some example scenarios in which an emergency maneuver (EM) begins in an autonomous driving system.
Figure 6B:
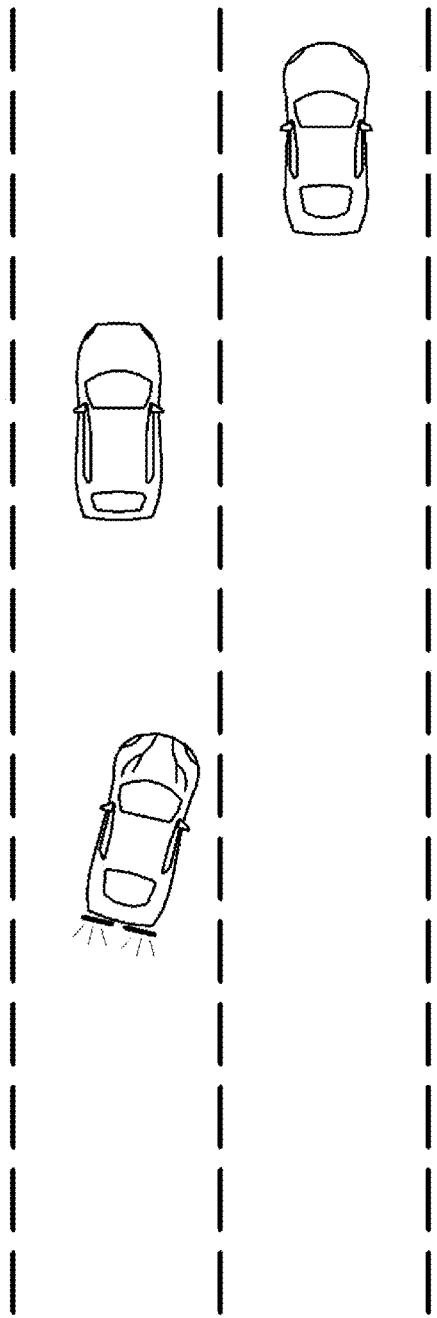
Figure 6C:
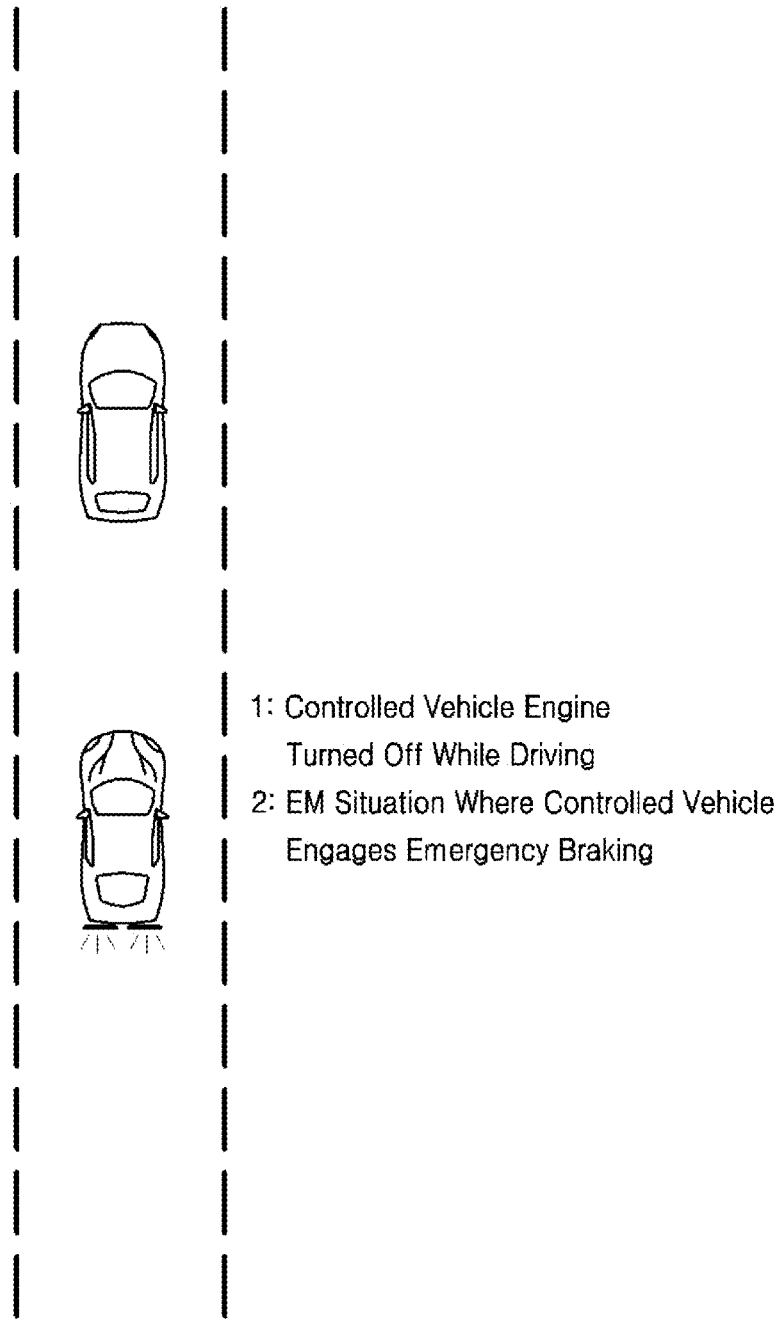
Figure 6D:
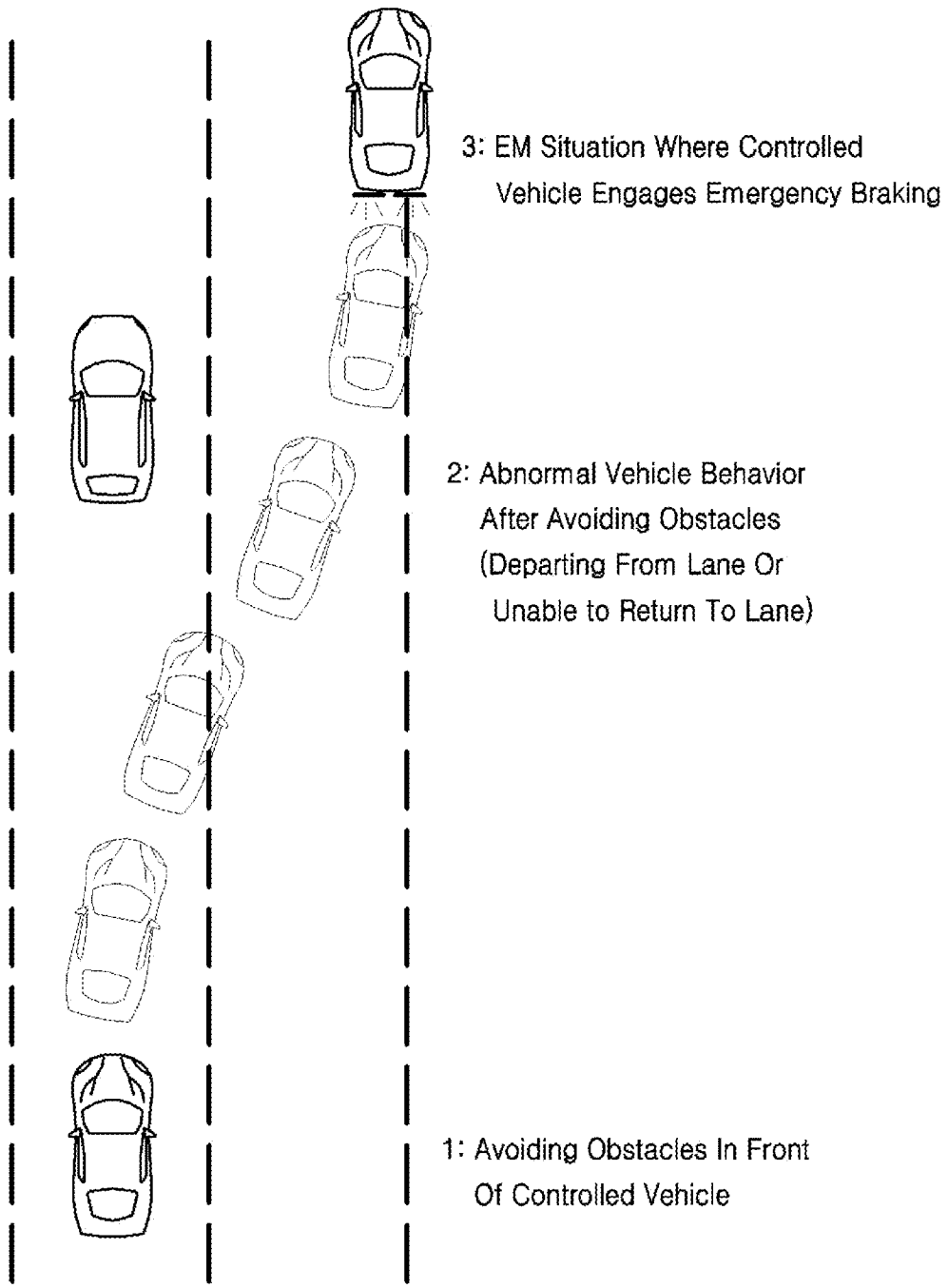

FIG. 5 is a flowchart of a TTC-based method of determining the occurrence of an event to trigger an EDR system, according to at least one embodiment of the present disclosure.

Of the autonomous driving system, a subsystem, e.g., forward collision avoidance assist (FCA) or similar collision mitigation system may calculate a TTC (S510) and determine whether the calculated TTC is extremely short (S520). For example, the subsystem may determine whether the calculated TTC is shorter than a preset threshold, e.g., 2 seconds.

Upon determining that the calculated TTC is extremely short or the calculated TTC is shorter than a preset threshold value, that is, 'Yes' in S520, the subsystem immediately generates a trigger signal that triggers the recording of the EDR system (S550). At the same time, the subsystem may control the braking system to perform emergency braking.

When the calculated TTC is not shorter than the preset threshold value, that is, 'No' in S520, the subsystem determines whether a collision is unavoidable by performing braking based on the current speed of the vehicle (S530). For example, the subsystem may determine that the collision is unavoidable when the deceleration required to avoid the collision exceeds a predetermined maximum deceleration (limit deceleration) of the vehicle. Alternatively, upon determining that the current speed of the vehicle exceeds a threshold speed, the subsystem may determine that a collision is unavoidable. When it determines that a collision cannot be avoided by performing braking based on the current vehicle speed, that is, 'Yes' in S530, the subsystem generates a trigger signal for triggering the recording of the EDR system (S550).

When the deceleration required to avoid a collision does not exceed the predetermined maximum deceleration (limit deceleration) of the vehicle, that is, 'No' in S530, the subsystem may perform, until the next TTC is determined, repeated comparison between the required decelerations and the limit deceleration (corresponding to the vehicle speed changed by braking, etc.) of the vehicle (S540).

(3) where Emergency Maneuver (EM) Engages

EM is a maneuver is provided to avoid or mitigate a collision and is performed by an autonomous driving system in case of a sudden and unexpected event in which the vehicle is in danger of colliding with another object.

The autonomous driving system may be responsive to a sudden and unexpected event for detecting, for example, whether a vehicle is in imminent danger of colliding with a road user in front or on the side of the vehicle. If the time is too short for the driver to safely switch back the control, EM is automatically initiated. To avoid or mitigate an impending collision, the EM may perform protective deceleration or automatic avoidance maneuvers up to the vehicle's maximum braking performance. The autonomous driving system may generate a trigger signal that triggers the recording of the EDR system when the EM is initiated.

FIGS. 6A to 6D illustrate some example scenarios in which an emergency maneuver (EM) begins in an autonomous driving system.

Unable to control inter-vehicle distance maintenance, i.e., longitudinally uncontrollable (as in FIG. 6A): When a collision risk is expected during lane-keeping and inter-vehicle distance maintenance control, the Forward Collision-Avoidance Assist (FCA) system may have its emergency braking activated. However, when expecting the risk of collision between the subject vehicle and the preceding vehicle because the preceding vehicle suddenly stops due to sudden braking or collision, the present disclosure allows the vehicle to engage emergency braking up to its maximum braking performance in a shorter time than emergency braking of the FCA system.

Unable to control lane keeping, i.e., laterally uncontrollable (as in FIG. 6B): When a defect in Motor-Driven Power Steering (MDPS) or other reasons cause the subject vehicle to depart from the current driving lane and expectedly collide with another vehicle located in a neighboring lane, the present disclosure allows the subject vehicle to engage emergency braking.

Engine off while driving, i.e., longitudinally and laterally uncontrollable (as in FIG. 6C): As soon as the engine is turned off during lane-keeping and inter-vehicle distance maintenance control, the present disclosure allows the vehicle to engage emergency braking.

Dangerous situation after avoidance of a forward obstacle (as in FIG. 6D): As soon as an abnormality occurs in the vehicle's behavior after avoidance maneuvering against a forward obstacle, e.g., when the vehicle departs from a lane or is unable to return to the driving lane, the present disclosure allows the vehicle to engage emergency braking.

(4) Where Minimal Risk Maneuver (MRM) Engages

When there is a failure occurring in the autonomous vehicle, such as a defect in the autonomous driving sensor, when an intrusion detection system (IDS) detects an intrusion into the in-vehicle network, or when there are other reasons for the driver to take manual control, the autonomous driving system may issue the driver a control transition demand.

The MRM means a procedure aimed at minimizing the traffic risk and performed automatically by the autonomous driving system, for example when the driver fails to respond to a control transition demand.

The autonomous driving system may detect whether the driver has resumed manual control after issuing the transition demand. If the driver does not resume manual control within a certain period, the MRM may be initiated immediately. The MRM may be terminated when the vehicle detects that the driver has taken over manual control of the vehicle. The MRM may automatically perform one or more of the following actions: (a) slowing the vehicle within its lane, with a deceleration of 4 m/s$^2$ or less, and (b) stopping the vehicle in a lane other than the high-speed lane, e.g., in the low-speed lane, emergency lane, or roadside.

Initiation of MRM may trigger a recording of the EDR system. MRM control may be operated in various ways depending on the causal cases, bearing in mind that sometimes a situation may occur with a long event duration. Depending on the cause of the initiation of MRM, the recording method of the EDR system may also vary.

In some embodiments, when MRM is initiated because the driver does not respond to a control transition demand, the EDR system continuously stores information on the recognition-judgment-control process by the autonomous driving system while the MRM is performed.

In some embodiments, when MRM is initiated due to a fault of the autonomous driving sensor, the EDR system stores the identifier (ID) of the faulty sensor and the time of failure, while it continues its recording operation until the user takes the driving control.

Some embodiments lower the threshold of the determination criterion or trigger condition for determining the occurrence of an event triggering the recording of the EDR system from the moment when the MRM is initiated, thereby increasing the sensitivity to the event. For example, in some embodiments, the autonomous driving system triggers, before the MRM starts, the recording of the EDR system in response to a detection of sudden acceleration/deceleration showing a speed change of 8 km/h or more within 150 ms, while the autonomous driving system triggers, during the MRM, the recording of the EDR system in response to a detection of acceleration/deceleration showing a speed change of 4 km/h or more within 150 ms.

Figure 7:
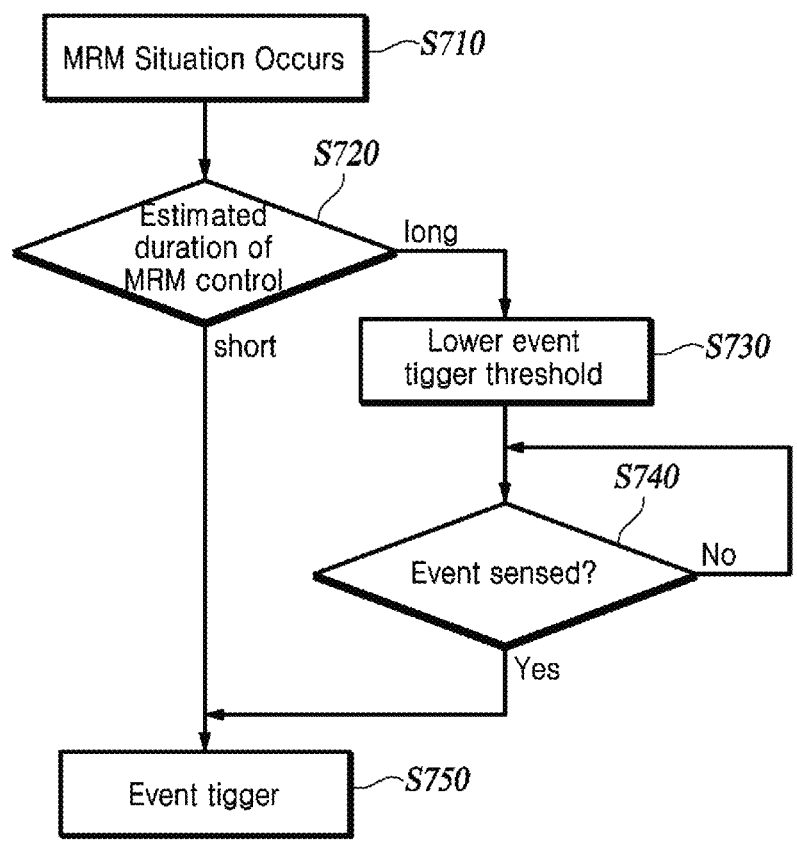
FIG. 7 is a flowchart of a method of triggering a recording of an EDR system upon initiation of a minimal risk maneuver (MRM), according to at least one embodiment of the present disclosure.

FIG. 7 is a flowchart of a method of triggering a recording of an EDR system upon initiation of a minimal risk maneuver (MRM), according to at least one embodiment of the present disclosure.

Upon detecting the occurrence of a situation causing MRM initiation (S710), the autonomous driving system may estimate the duration of MRM control based on the situation causing MRM initiation (S720). If the estimated duration is shorter than a preset threshold value ('short' in S710), the autonomous driving system may immediately trigger the recording of the EDR system (S750).

When the estimated duration is longer than the preset threshold ('long' in S710), the autonomous driving system may lower the determination criterion for determining the occurrence of an event triggering the recording of the EDR system or a threshold of the trigger condition (S730). Thereafter, the autonomous driving system may monitor the occurrence of an event triggering the recording of the EDR system by applying the relaxed determination criterion or a threshold of the trigger condition (S740). Upon detecting the occurrence of an event that satisfies the relaxed determination criterion ('Yes' in S740), the autonomous driving system may trigger recording of the EDR system (S750).

Meanwhile, when various trigger signals are used for triggering the recording of the EDR system, a new trigger signal may be generated before the termination of data recording of the EDR system according to any one trigger signal. In this way, when a plurality of trigger signals are continuously generated, the EDR system may extend the data recording time and store the type of the event that occurred (or trigger signal) and the time of occurrence of the event. The trigger signals may include an identifier that uniquely identifies the type of event. In this case, the data elements recorded during the extended period may be the same as or less than the data elements recorded in the period corresponding to the first trigger signal.

(5) When Security Threat to Vehicle Network is Detected

The vehicle may include an intrusion detection system (IDS) configured to detect and tackle security threats to the in-vehicle network. When the intrusion detection system detects an intrusion into the in-vehicle network, it may generate a trigger signal that triggers the recording of the EDR system.

When the EDR system is configured to receive various trigger signals in this way, the EDR system may apply data elements to be recorded and/or recording periods differently for at least some trigger signals.

EDR Data Elements Suitable for Autonomous Vehicles

In autonomous vehicles, the autonomous driving system operates based on information collected from inside and outside the vehicle to recognize the environment, determine actions for each situation, and control the actuators, etc. Accordingly, an error that occurs in the recognition-judgment-control process may lead to an accident. To properly identify the cause of an accident of an autonomous vehicle, it is desirable to record and store information on the recognition-judgment-control process of the autonomous vehicle.

Figure 8:
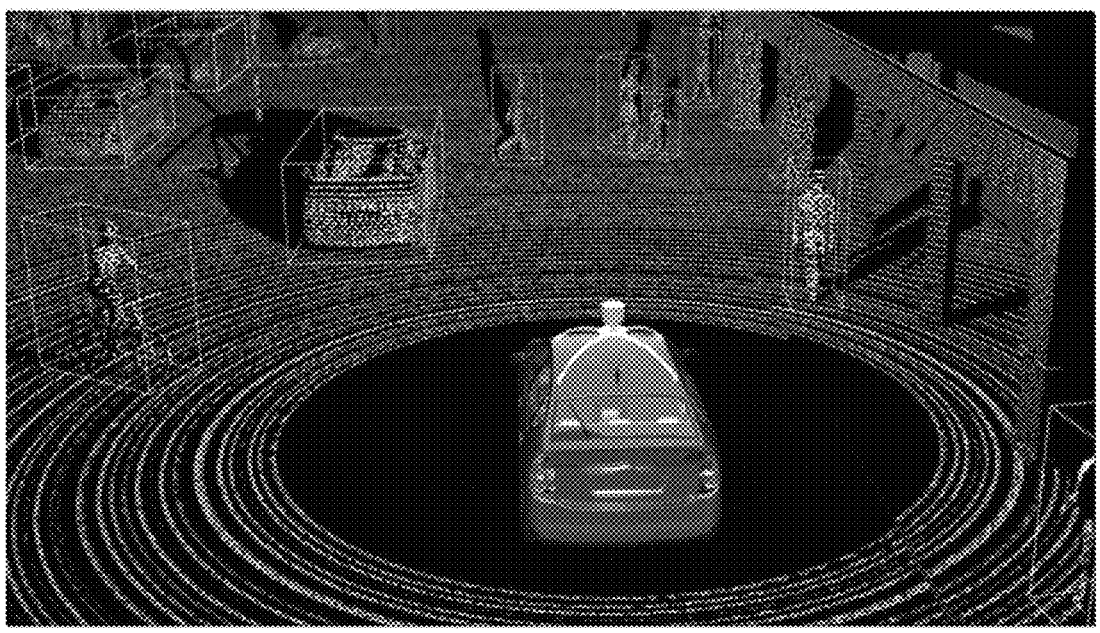
FIG. 8 illustrates an external environment map surrounding an autonomous vehicle.

The present disclosure provides EDR data elements suitable for identifying the cause of an event occurring in an autonomous vehicle. In particular, these data elements can be useful for reconstructing an external environment map (as shown in FIG. 8) surrounding the autonomous vehicle at the time of occurrence of the event and reconstructing the internal environment of the vehicle.

The EDR data according to at least one embodiment of the present disclosure includes a software version, autonomous driving data, camera images inside and outside the vehicle, occupant recognition data, vehicle to everything (V2X) message, and the like.

The software version indicates the software version of each of the electronic control units (ECUs) mounted on the vehicle. The occupant recognition data may indicate the driver's state (e.g., distraction, drowsiness, non-responsive state), the presence or absence of a passenger, and the like. Further, the EDR data may include information on recent V2X messages exchanged with the infrastructure and surrounding vehicles through V2X communications.

Figure 9:
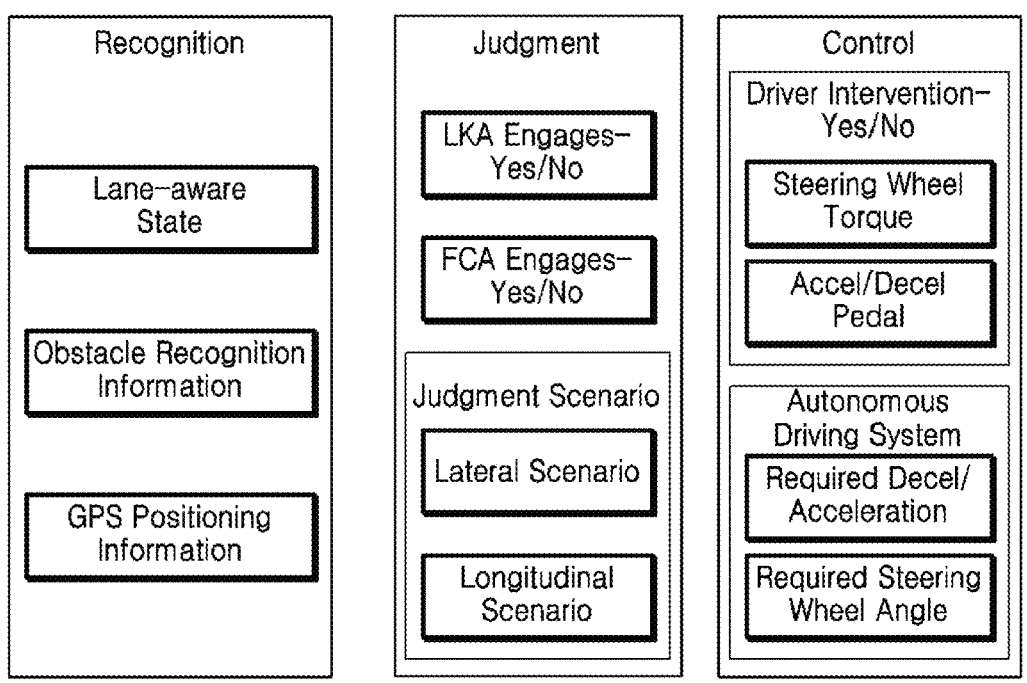
FIG. 9 illustrates autonomous driving data to be stored by an EDR system, according to at least one embodiment of the present disclosure.

As illustrated in FIG. 9, the autonomous driving data includes <recognition data>, <judgment data>, and <control data>.

The <recognition data> of the autonomous driving data may include the following information.

Detected obstacle classification: Includes information on recognized dynamic obstacles that may cause an accident while driving a vehicle (e.g., a class of objects such as pedestrians, bicycles, two-wheeled vehicles, passenger cars, and buses).

Lane recognition information: Includes lane geometry parameters (curvature, curvature rate, heading angle, lateral offset) outputted from the computer vision system and a quality indicator indicating the reliability of lane geometry measurement.

Vehicle location information and used positioning technology: Information on the used positioning technology includes, for example, information such as GPS, V2X, whether or not a precision map is used, and the version of the used precision map.

Recognized Time To Collision (TTC)

The <judgment data> of the autonomous driving data may include the following information.

Whether autonomous driving functions (LKA, FCA, etc.) are activated

Object data analyzed after recognition of the surroundings: Include the class of recognized objects, x,y coordinates/size/relative speed (from using sensor fusion), moving speed and direction of the subject vehicle, etc. These data can be useful in reconstructing a map of the external environment surrounding the autonomous vehicle at the time of the event.

Behavioral scenario for the determined driving situation (lateral and longitudinal scenarios): E.g., lane keeping, lane change, left/right turn, U-turn, emergency stop, shoulder stop, parking, adjacent vehicle's cut-in, front vehicle's cut-out, etc.

The <control data> of the autonomous driving data may include the following information.

Driver control information: Control information of actuators for required steering wheel torque, required acceleration/deceleration pedal, etc.

Autonomous driving control information: Control information of actuators for required steering wheel torque, required acceleration/deceleration pedal, etc.

It should be understood that the illustrative embodiments described above may be implemented in many different ways. In some examples, the various methods, apparatuses, systems, and subsystems described in this disclosure may be implemented by a general-purpose computer having a processor, memory, disk or other mass storage, communication interface, input/output (I/O) devices, and other peripherals. The general-purpose computer can function as an apparatus for executing the method described above by loading software instructions into a processor and then executing the instructions to perform the functions described in this disclosure.

It should be understood that the exemplary embodiments described above may be implemented in many different ways. In some examples, the various methods, devices, systems, and subsystems described in the present disclosure may be implemented by a general-purpose computer having a processor, memory, disk or other mass storage, communication interface, input/output (I/O) devices, and other peripherals. The general-purpose computer may function as an apparatus executing the above-described methods by loading software instructions into the processor and then executing the instructions to perform the functions described in the present disclosure.

It should also be understood that the functional components described in this specification are labeled by '... unit or module' to strongly emphasize the possibility of their independent implementations. For example, a module may be implemented as a custom very-large-scale integration (VLSI) circuit or hardware circuit including semiconductors such as gate arrays, logic chips, and transistors. A module may also be implemented as a programmable hardware device, such as a field-programmable gate array (FPGA), programmable array logic, programmable logic devices, and the like.

Meanwhile, various methods described in the present disclosure may be implemented as instructions stored in a non-transitory recording medium that can be read and executed by one or more processors. The non-transitory recording medium includes, for example, all types of recording devices in which data is stored in a form readable by a computer system. For example, the non-transitory recording medium may include storage media such as erasable programmable read-only memory (EPROM), flash drive, optical drive, magnetic hard drive, and solid-state drive (SSD) among others.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

The invention claimed is:

1. A method performed by a vehicle operating fully or partially in an autonomous driving mode for collecting and recording event data, the method comprising:
   detecting, by an autonomous driving system, an occurrence of an event from a plurality of predefined events based on a trigger condition;
   transmitting, by the autonomous driving system, a trigger signal to an event data recorder (EDR) system, the trigger signal indicating the occurrence of the event that satisfies the trigger conditions;
   receiving, by the EDR system, the trigger signal;
   collecting, by the EDR system, event data comprising autonomous driving data including recognition data, judgment data and control data generated before and after the occurrence of the event, wherein the recognition data, the judgment data and the control data are related to processes of recognizing an environment, determining actions and controlling actuators; and
   recording, by the EDR system, the event data in a storage and uploading the event data to a remote server communicatively linked with the vehicle,
   wherein, during a Minimal Risk Maneuver (MRM), the detecting of the occurrence of the event is performed, by the autonomous driving system, based on a relaxed threshold of the trigger condition, the MRM being a procedure performed automatically by the autonomous driving system for minimizing traffic risk when a driver fails to respond to a control transition demand, and
   wherein the relaxed trigger condition includes at least one trigger condition with a lowered threshold.

2. The method of claim 1, wherein the event data further comprises:
   at least one of a camera image inside or outside the vehicle, data of recognition of an occupant in the vehicle, software version information of electronic control units (ECUs) installed in the vehicle, and a vehicle-to-everything (V2X) message.

3. The method of claim 1, wherein the event data further comprises:
   object recognition information used for reconstructing a map of an external environment surrounding the vehicle before and after the occurrence of the event.

4. The method of claim 1, wherein a first event among the plurality of events is different from a second event among the plurality of events in data elements or recording periods thereof.

5. The method of claim 1, wherein the receiving of the trigger signal comprises:
   receiving a trigger signal indicating that the vehicle has departed from a lane.

6. The method of claim 1, wherein the receiving of the trigger signal comprises:
   receiving a trigger signal indicating that the vehicle at a current speed cannot avoid a collision through braking the vehicle.

7. The method of claim 1, wherein the receiving of the trigger signal comprises:
   receiving a trigger signal indicating that an Emergency Maneuver (EM) or the MRM has been initiated.

8. The method of claim 1, wherein the receiving of the trigger signal comprises:
   receiving a trigger signal indicating a detection of an intrusion into an in-vehicle network.

9. The method of claim 1, further comprising:
   in response to a new trigger signal indicating an occurrence of a new event received before a recording period of the event data ends, extending the recording period and additionally recording a type and an occurrence time of the new event.

10. A vehicle system, comprising:
    an autonomous driving system configured to control a vehicle to operate fully or partially in an autonomous driving mode;
    a wireless communication system configured to enable communication between the vehicle and an external system; and
    an event data recorder (EDR) system configured to collect and manage event data,
    wherein the autonomous driving system is configured to detect an occurrence of an event from a plurality of predefined events based on a trigger condition, and transmit a trigger signal to the EDR system, the trigger signal indicating the occurrence of the event that satisfies the trigger conditions,
    wherein the EDR system is configured to:
      receive the trigger signal,
      collect event data comprising autonomous driving data including recognition data, judgment data and control data generated before and after the occurrence of the event, wherein the recognition data, the judgment data and the control data are related to processes of recognizing an environment, determining actions and controlling actuators, and
      record the event data in a storage and upload the event data to a remote server via the wireless communication system,
    wherein, during a Minimal Risk Maneuver (MRM), the detecting of the occurrence of the event is performed, by the autonomous driving system, based on a relaxed threshold of the trigger condition, the MRM being a procedure performed automatically by the autonomous driving system for minimizing traffic risk when a driver fails to respond to a control transition demand, and
    wherein the relaxed trigger condition includes at least one trigger condition with a lowered threshold.

11. The vehicle system of claim 10, wherein the trigger signal comprises:
    a trigger signal for indicating that the vehicle has departed from a lane.

12. The vehicle system of claim 10, wherein the trigger signal comprises:
    a trigger signal for indicating that the vehicle at a current speed cannot avoid a collision through braking the vehicle.

13. The vehicle system of claim 10, wherein the trigger signal comprises:
    a trigger signal for indicating that an Emergency Maneuver (EM) or the MRM has been initiated.

14. The vehicle system of claim 10, wherein the trigger signal comprises:
    a trigger signal for indicating a detection of an intrusion into an in-vehicle network.

15. The vehicle system of claim 10, wherein the EDR system is configured to be further responsive to a new trigger signal indicating an occurrence of a new event received before a recording period of the event data ends, for extending the recording period and additionally recording a type and an occurrence time of the new event.

16. The vehicle system of claim 10, wherein the EDR system is embedded as a functional module in a main controller of the autonomous driving system or an airbag control unit (ACU), or is connected to an in-vehicle network as an independent electronic control unit (ECU) separate from the main controller or the ACU.

* * * * *